W. T. MERSEREAU.

STAIR-RODS.

No. 7,111. Reissued May 16, 1876.

Witnesses:

H. Newell

James A. Hunter

Inventor:

W. T. Mersereau

N. PETERS, PHOTO-LITHOGRAPHER, WASHINGTON, D. C.

UNITED STATES PATENT OFFICE.

WILLIAM T. MERSEREAU, OF ORANGE, NEW JERSEY.

IMPROVEMENT IN STAIR-RODS.

Specification forming part of Letters Patent No. 107,941, dated October 4, 1870; reissue No. 7,111, dated May 16, 1876; application filed November 16, 1875.

*To all whom it may concern:*

Be it known that I, WILLIAM T. MERSEREAU, of Orange, in the State of New Jersey, have invented certain new and useful Improvements in Fastenings for Stair-Rods; and hereby declare that the following is a full, clear, and exact description of the same, reference being had to the accompanying drawings, which form part of this specification.

Before my invention sheet-metal stair-rod fastenings were constructed in various ways. In one case a band was passed over the flat rod, having ears at its extremities for securing the rod to the stair-case by the aid of tacks or small screws. In this instance the rod was merely encompassed in the angle of the stair-case against the carpet, and not secured within the fastening itself. Also, such fastening, taken as a whole, is practically continuous, and very liable to become bent by reason of there being no under support to the parts. In the other case the flat rod was secured by overlapping bands of the fastening, the bands holding the rod down, while at the same time the back of the fastenings served to retain the rod as within a socket, so that there was no danger of the rod shifting in the angle of the stair-case against the carpet; but there was no element combined with this fastening by which it could be conveniently secured to the stair-case, and released therefrom. In case it was desired to release the fastening from the stairs the rod had to be first withdrawn.

By my invention I have combined in a fastening a support for both edges, a support for the rear surface of the rod with another element, namely, ears exterior thereto, for the attaching and detaching of the fastening, thus overcoming the objectionable features of and difficulties experienced with both classes of fastenings for flat rods heretofore in use.

Figure 1:
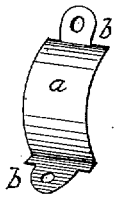
Figure 2:
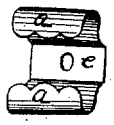
Figure 3:
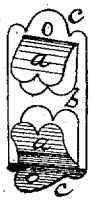
Figure 4:
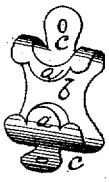
Figure 5:
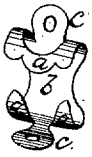
Figure 6:
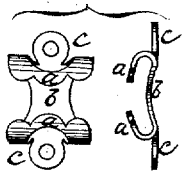

In the drawings, Figure 1 represents one class of fastenings referred to; Fig. 2 represents the other; and Figs. 3, 4, 5, and 6 are several illustrations of fastenings, in each of which is embodied my invention.

In Fig. 1 is seen the support *a* for the front of the rod, consisting of the whole of the band of the fastening; also the ears *b b* for attaching the fastening to the stair-case, but there is here found no support for the rear surface of the rod.

In Fig. 2 is seen the support *a a* for the edges of the rod, consisting of overlapping portions of a band, and a support, *e*, for the rear surface of the rod, but there is here found no way of attaching the fastening to the stair-case, except by passing a nail or screw through some part of this support *e* or back of the fastening.

In Figs. 3, 4, 5, and 6 will be found a support, *a a*, for the two edges of the rod, consisting of a part of a band, being shown as formed up from out of the part which constitutes the back or rear support to the rod; also, the back *b*, which is left after the front support has been cut out and formed up therefrom, proper incisions having been made in the sheet metal for that purpose, also, exterior to these two elements, which form a socket for the rod to pass into or through, a third element, namely, ears *c*, for the purpose of attaching this socket form of stair-fastening to the stair-case, and also for releasing it therefrom without first withdrawing the rod. These parts so combined are struck or formed up out of sheet metal, all in one piece, by suitable tools.

I claim—

A formed-up sheet-metal stair-rod fastening, in which there is a support or back for the rear surface, and a support for the two edges of the rod, and two ears exterior to such parts, all in one piece, substantially as described.

W. T. MERSEREAU.

Witnesses:

K. NEWELL,

JAMES H. HUNTER.